United States Patent [19]

Harris et al.

[11] Patent Number: 4,645,309

[45] Date of Patent: Feb. 24, 1987

[54] METHOD AND APPARATUS FOR ACOUSTO-OPTIC CHARACTER GENERATION

[75] Inventors: Jeffery J. Harris, Gwent, Wales; Allister McNeish, Bristol, England

[73] Assignee: Isomet Corporation, Springfield, Va.

[21] Appl. No.: 729,218

[22] Filed: May 1, 1985

[51] Int. Cl.$^4$ .......................... G02F 1/33; H04N 5/74
[52] U.S. Cl. ...................................... 350/358; 358/235
[58] Field of Search ................ 350/358, 371; 358/201, 358/235; 372/13

[56] References Cited

U.S. PATENT DOCUMENTS

| | | | |
|---|---|---|---|
| 2,267,251 | 12/1941 | Okolicsanyi | 178/7.5 |
| 3,625,600 | 12/1971 | Rowe | 350/161 |
| 3,633,995 | 1/1972 | Lean et al. | 350/161 |
| 3,698,794 | 10/1972 | Alphonse | 350/161 |
| 3,707,323 | 12/1972 | Kessler et al. | 350/161 |
| 3,727,062 | 4/1973 | Foster | 250/199 |
| 3,731,231 | 5/1973 | Torguet | 332/7.51 |
| 3,744,039 | 7/1973 | Hrbek et al. | 340/173 |
| 3,759,603 | 9/1973 | Eschler | 350/161 |
| 3,851,951 | 12/1974 | Eveleth | 350/161 |
| 3,900,851 | 8/1975 | Bucy et al. | 346/49 |
| 3,935,566 | 1/1976 | Snopko | 340/173 |
| 3,964,825 | 6/1976 | Eschler | 350/161 |
| 3,988,055 | 10/1976 | McNaney | 350/160 |
| 4,000,493 | 12/1976 | Spaulding et al. | 346/1 |
| 4,004,847 | 1/1977 | McNaney | 350/161 |
| 4,032,220 | 6/1977 | McNaney | 350/161 |
| 4,040,722 | 8/1977 | Nielsen | 350/161 |
| 4,054,367 | 10/1977 | Eschler et al. | 350/150 |
| 4,090,204 | 5/1978 | Farhat | 350/161 |
| 4,158,486 | 6/1979 | McNaney | 350/358 |
| 4,162,121 | 7/1979 | Starkweather et al. | 350/358 |
| 4,201,455 | 5/1980 | Vadász et al. | 350/358 |
| 4,206,347 | 6/1980 | Avicola et al. | 455/603 |
| 4,321,564 | 3/1982 | Tregay | 332/7.51 |
| 4,332,441 | 6/1982 | Margolis | 350/358 |
| 4,370,029 | 1/1983 | Sprague et al. | 350/355 |

FOREIGN PATENT DOCUMENTS 54-5752 1/1979 Japan .
54-139743 10/1979 Japan .
252668 2/1970 U.S.S.R. .

OTHER PUBLICATIONS

Cook, "A Procedure for Calculating the Integrated Acousto-Optic (Raman-Nath) Parameter for the Entire Sound Field", IEEE Ultrasonics Symposium, pp. 90-93, 1979.
Ingenito et al, "Theoretical Investigation of the Integrated Optical Effect Produced by Sound Fields Radiated from Plane Piston Transducers", Journal of the Acoustical Society of America, vol. 45, No. 3, pp. 572-577, 1969.
Cook et al, "A Numerical Procedure for Calculating the Integrated Acoustooptic Effect", IEEE Transactions on Sonics and Ultrasonics, vol. SU-27, No. 4, pp. 202-207, 1980.

*Primary Examiner*—Bruce Y. Arnold
*Attorney, Agent, or Firm*—Shapiro and Shapiro

[57] ABSTRACT

Traveling acoustic energy packets having predetermined frequencies and representing associated portions of a character are introduced as sequences in one or more acoustic energy columns within a body of acousto-optic material in order to form an acoustic energy representation of the character within the body. A beam of light with height substantially equal to the character representation is pulsed into the body to interact with the energy packets and produce a plurality of pulsed diffracted output beams. The output beams are directed to corresponding spots in a reproduction plane to form an image of the character at that plane. The acoustic energy packet sequences are repeated for the duration of the incident light pulse so that acoustic energy packets traveling out of the light beam are replaced by similar packets traveling into the beam, whereby the spots in the reproduction plane are uniformly exposed by diffractred light from the acousto-optic body.

22 Claims, 4 Drawing Figures

METHOD AND APPARATUS FOR ACOUSTO-OPTIC CHARACTER GENERATION

BACKGROUND OF THE INVENTION

This invention relates to acousto-optic character generators and is more particularly concerned with improvements in acousto-optic character generators of the type disclosed in co-pending U.S. patent application Ser. No. 550,590, filed Nov. 10, 1983 and commonly assigned herewith (incorporated herein by reference) now U.S. Pat. No. 4,540,245.

Broadly speaking, in character generators of the foregoing type a bulk wave acoustic energy representation of a character (or characters) to be reproduced is coupled into a body of acousto-optic material which is then illuminated by a discrete pulse of light, such as a pulsed laser beam. The acoustic wave fronts propagating through the body cause the incident beam to be diffracted, providing a plurality of output beams corresponding to different portions of the character. The output beams are directed to appropriate locations in a character reproduction plane to form an image of the character.

In greater detail, the representation of the character takes the form of one or more sequences of traveling acoustic energy packets which are introduced into respective acoustic energy columns in the acousto-optic body by selectively energizing members of a set of acoustic transducer electrodes mounted on the body. Each sequence of packets represents a respective column of the character, with the individual packets in a given sequence having different predetermined frequencies and corresponding to different portions of the character column.

When one or more character representations have been coupled into the acousto-optic body in the manner just described, a laser beam is pulsed into the body at the so-called Bragg angle. The various acoustic energy packets within the body interact with the incident beam to yield corresponding columns of pulsed diffracted light beams emerging form the body. The direction of each output beam is fixed by the frequency of its corresponding acoustic energy packet in accordance with generally understood acousto-optic principles. The output beams are then directed to a character reproduction plane through a converging lens having a focal plane coincident with the reproduction plane. The converging lens, which may be a spherical convex lens, acts to focus all light rays which enter it in the same direction (i.e., parallel light rays) to a single spot in the reproduction plane, regardless of the rays' points of entry into the lens. Therefore, even though the respective sources of the diffracted beams (i.e., the acoustic energy packets) move through the acousto-optic body while exposed to the laser pulse, the lens directs the beams toward corresponding fixed points (focal points) in the reproduction plane because the directions of the beams are fixed by the frequencies of the respective acoustic energy packets. In order to prevent the converging lens from focusing diffracted beams from adjacent acoustic energy columns to common points (as would occur in the case of adjacent beams originating from packets of the same frequency) and in order to form distinct columns of fixed spots at the reproduction plane, a diverging lens is interposed between the converging lens and the reproduction plane to compensate the tendency of the converging lens to focus transversely to the acoustic energy columns. The resulting columns of spots in the reproduction plane form an image of the character.

SUMMARY OF THE INVENTION

While the system just described is capable of high resolution character reproduction at very high speeds, it has been found that certain modifications may be desirable in practice for increasing laser energy utilization efficiency and simplifying the design of the acousto-optic interaction cell (acousto-optic body and associated transducer assembly). These improvements, as will be described hereinafter, achieve a reduction in both operating and manufacturing costs of the character generator system.

In the previous character generator, in order to obtain a set of spots having equal intensities in the character reproduction plane, it is necessary that all acoustic energy packets in a character representation be exposed to the laser beam for the same period of time (e.g., the duration of the laser pulse). This assures that the diffracted output beams have equal durations so that the character image will be of uniform intensity throughout. Obviously, if any packets are permitted to travel out of the incident beam path, the associated diffracted beams will have a shorter duration than diffracted beams from packets remaining in the beam path, and the corresponding image spots will have lower exposure levels.

The desired equality of exposure of the energy packets to the incident beam requires: (1) well-defined acoustic energy columns of sufficient length to accommodate an entire character representation for the duration of the laser pulse and (2) a laser beam of sufficient height to impinge the representation in its entirety as it travels through the acousto-optic body. (The term height herein refers to the dimension of the beam in the direction of the acoustic energy columns.) The first of these factors necessitates a wide electrode structure to maintain the integrity of the acoustic energy columns along their lengths—in particular, to avoid divergence and minimize attenuation. The second factor requires laser beam spreading in the direction of the columns and high laser power levels to provide the desired output beam intensity at the reproduction plane.

In accordance with the present invention, it has been discovered that by employing a laser beam having a height equal to that of the acoustic character representation and by repeating each sequence of acoustic energy packets within the acousto-optic body for the duration of the laser pulse, the laser energy requirements and structural complexity of the previous character generator can be substantially reduced. With this improved technique, acoustic energy packets are permitted to travel out of the laser beam at one side but are simultaneously replaced by identical packets entering the beam at the opposite side. Consequently, a packet's worth of energy at each frequency in any given sequence is exposed to the laser beam for the entire duration of the laser pulse, and the corresponding spots in the reproduction plane are equally exposed by the diffracted beams to yield a character image of uniform intensity. Laser energy consumption is significantly reduced in comparison with the previous system as a result of the decrease in beam height, while design requirements are simplified because the need to maintain long, well-defined acoustic energy columns in the acousto-optic body is eliminated. Shorter acoustic energy columns in particular permit a reduction in acousto-optic body height in comparison with the previous system. Shorter columns also exhibit less acoustic attenuation and divergence and thus permit the use of a more compact acoustic transducer structure and a reduction in width of the acousto-optic body.

To summarize more specifically, in one of its broad aspects the invention provides a method of reproducing character information by acousto-optic interaction, comprising providing a body of acousto-optic material and means for introducing a column of acoustic energy into the body, the column corresponding to a column of character information; introducing into the acoustic energy column a sequence of traveling acoustic energy packets each having a different predetermined frequency and representing a respective portion of the column of character information; pulsing a beam of light into the body for interaction with acoustic energy packets within the body to create corresponding diffracted output beams, the beam of light having a dimension in the direction of the acoustic energ column substantially the same as that of the sequence of packets; repeating the sequence of packets for the duration of said pulsing so that each packet traveling out of the light beam is replaced by another packet of the same frequency traveling into the beam for creating a corresponding diffracted output beam; and directing all of the diffracted output beams to corresponding fixed locations in a character reproduction plane, with diffracted beams corresponding to acoustic energy packets of the same frequency being directed to the same location in the plane, to produce an image of the corresponding portions of the character information column.

In another of its broad aspects, the invention provides apparatus for reproducing character information by acousto-optic interaction, comprising a body of acousto-optic material; means for introducing into a column within the body a sequence of traveling acoustic energy packets each having a different predetermined frequency and representing a respective portion of a column of character information; means for pulsing a beam of light into the body for interaction with acoustic energy packets therein to create corresponding diffracted output beams, the beam of light having a dimension in the direction of the acoustic energy column substantially the same as that of the sequence of packets; means for repeating the sequence of packets for the duration of the pulsing so that each packet traveling out of the beam is replaced by another packet of the same frequency traveling into the beam for creating a corresponding diffracted output beam; and means for directing all of the diffracted output beams to corresponding fixed locations in a character reproduction plane, with diffracted beams corresponding to acoustic energy packets of the same frequency being directed to the same location in the plane, to produce an image of the corresponding portions of the character information column.

BRIEF DESCRIPTION OF THE DRAWING

More specific aspects and further advantages of the invention will become apparent hereinafter from the detailed description of the invention taken in conjunction with the accompanying drawing, wherein.

DETAILED DESCRIPTION OF THE INVENTION

Figure 1:
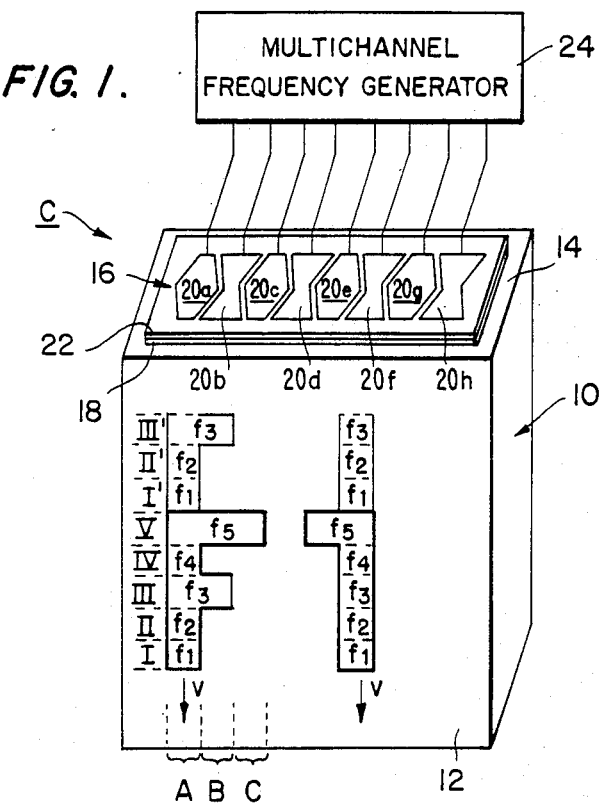
FIG. 1 is a diagrammatic perspective view of acousto-optic interaction apparatus for use in reproducing character information in accordance with the invention.

Referring now to the drawing, FIG. 1 illustrates an example of acousto-optic interaction apparatus which may be employed in a system for reproducing character information in accordance with the invention. In the form shown, the apparatus comprises an acousto-optic cell C, including a rectangular prismatic body of acousto-optic material 10 having a front face 12 and a top face 14. For the purposes of explanation it will be assumed that body 10 is oriented with its front face 12 in a vertical plane and its top face 14 in a horizontal plane. However, it will be appreciated that in practice body 10 may be oriented in any manner as may be suitable for a particular application.

Acousto-optic cell C also includes an acoustic transducer assembly 16 mounted on the top face 14 of body 10 for introducing bulk wave acoustic energy into the body. Transducer assembly 16 includes a common electrode 18 bonded directly to body top face 14 and a layer of piezoelectric material 22 bonded to the top surface of the common electrode. A plurality of control electrodes 20a–20h are bonded to the top surface of layer 22, as shown. The bonding of the trasnducer elements as just set forth may be effected by conventional methods.

In accordance with techniques well known in the art, control electrodes 20a–20h of transducer assembly 16 may be energized by suitable multi-channel frequency generator means 24 (e.g., a set of computer controlled ultrasonic oscillators) for introducing bulk wave acoustic energy into body 10. With the control electrode arrangement shown in FIG. 1, acoustic energy may be introduced into body 10 in a set of substantially parallel columns extending downward from the top face 14 of the acousto-optic body beneath the respective control electrodes. More particularly, the control electrode arrangement is of an overlapping design described in co-pending U.S. patent application Ser. No. 536,005, filed Sept. 26, 1983 and commonly assigned herewith (incorporated herein by reference) now U.S. Pat. No. 4,516,838. The arrangement includes complementary bitrapezoidal convex (20a, 20c, 20e, 20g) and concave (20b, 20d, 20f, 20h) electrodes nested across the top surface of body 10 for producing a set of overlapping acoustic energy columns. The details and advantages of such electrode arrangements are fully described in the co-pending application just referred to and will therefore not be addressed further herein.

By selectively energizing control electrodes 20a–20h it is possible to introduce acoustic energy representations of one or more characters into body 10 for interaction with a discrete pulse of light to be directed into the body as will be discussed later. Any character or character information composed of one or more columns of data may be represented acoustically within body 10. FIG. 1, for example, depicts representations of the characters F and 1 within the body. The character F will be referred to for the purposes of explaining the invention. Other characters may be treated similarly.

As will be apparent from FIG. 1, a representation of character F may be formed by three columns of character information, designated by reference letters A, B and C in the drawing, the bottom portions of the columns being indicated by dashed lines. As will also be apparent, each of the columns A, B and C may be subdivided into segments. By way of example, FIG. 1 shows five segments in each column, the segments being designated by Roman numerals I-V, respectively. Hence, column A of the representation includes five contiguous segments IA-VA each corresponding to a different portion of the character. Column B includes two spaced column segments IIIB and VB corresponding to respective portions of the character, while the final portion of the character is represented by segment VC in column C. The remaining segments of columns B and C are "blank" since the character does not occupy those portions of the columns.

The acoustic energy representation of character F may be introduced into body 10 by selectively energizing control electrodes 20a–20c. More particularly, each electrode is energized to couple a representation of a corresponding one of the columns A–C into the body, electrodes 20a, 20b and 20c corresponding respectively to columns A, B and C in the present embodiment. For reasons set forth in the aforementioned co-pending application Ser. No. 550,590, it is desirable to introduce each segment in a given column as an acoustic energy packet of unique predetermined frequency. The packets of each column are introduced into body 10 in sequence by energizing the appropriate electrode at selected times and frequencies. Five different frequencies, hereinafter denoted f1-f5, are required in the given example since as many as five character portions may be represented in a particular column (e.c., column A). The acoustic energy packets travel at the velocity of sound downwardly through the body in the columns beneath the respective electrodes. The downward movement of the packets in body 10 is indicated generally by arrows v in the drawing.

An appropriate energizing sequence for electrodes 20a–20c to produce the acoustic energy representation of character F is presented in tabular form in Table I. In connection with Table I it should be noted that it has been assumed that electrodes 20a–20c are energized for equal time periods, denoted arbitrarily as having a duration t. In practice, time period t will be determined giving consideration to various factors for ensuring that a complete acoustic energy representation of the character is accommodated within the body. Such factors include, for example, the number of segments in each character information column, the velocity of sound within the acousto-optic medium of body 10, and the length of body 10 in the direction of the acoustic energy columns.

TABLE I

Electrode Sequence for Introducing Acoustic Energy Representation of Character "F"

| Time | Electrodes Energized | Acoustic Frequency | Corresponding Character Information (Packet) |
|---|---|---|---|
| 0 | 20a | f1 | IA |
| t | 20a | f2 | IIA |
| 2t | 20a, 20b | f3 | IIIA, IIIB |
| 3t | 20a | f4 | IVA |
| 4t | 20a, 20b, 20c | f5 | VA, VB, VC |

In accordance with the invention, for reasons which will be explained hereinafter, the electrode sequence outlined in Table I is to be repeated one or more times so that the acoustic representation of character F is likewise repeated in cell C. Thus it will be seen in FIG. 1 that the traveling character representation F constituted by the previously identified acoustic energy packets in columns A-C is followed immediately by an identical representation, energy packets of which are indicated in the drawing by primed Roman numerals. Table II, which is a continuation in time of Table I, indicates the electrode sequence for the foregoing purpose.

TABLE II

Electrode Sequence for Repeating Acoustic Energy Representation of Character "F"

| Time | Electrodes Energized | Acoustic Frequency | Corresponding Character Information (Packet) |
|---|---|---|---|
| 5t | 20a | f1 | I'A |
| 6t | 20a | f2 | II'A |
| 7t | 20a, 20b | f3 | III'A, III'B |
| . | . | . | . |
| . | . | . | . |
| . | . | . | . |

Figure 2:
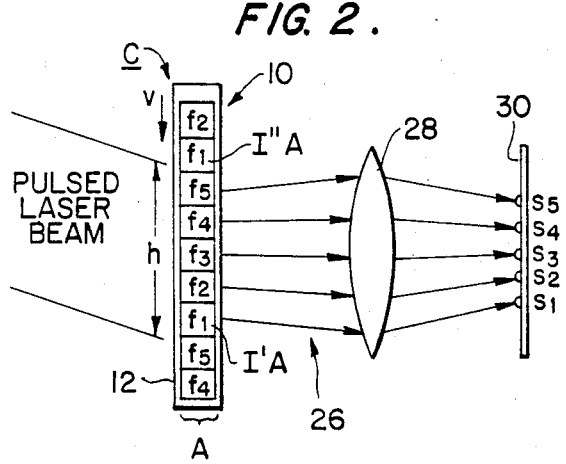
FIG. 2 is a diagrammatic side elevation of a system for acousto-optic reproduction of character information in accordance with the invention.
Figure 3:
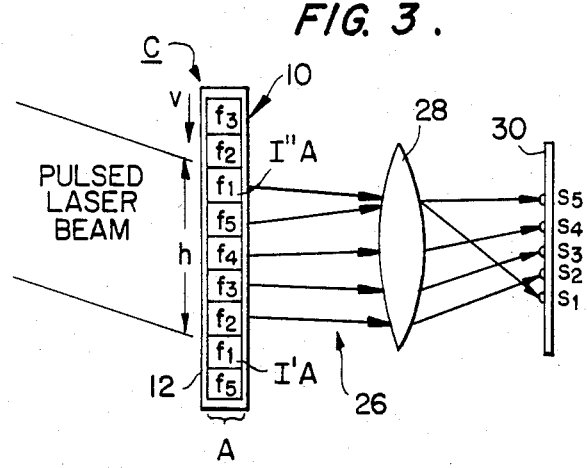
FIG. 3 shows the apparatus of FIG. 2 at a different time during the information reproduction process.
Figure 4:
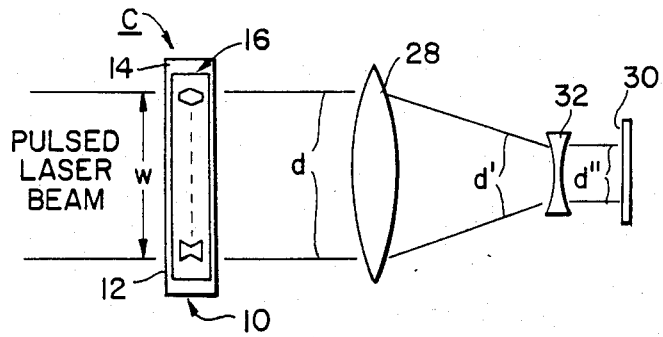
FIG. 4 is a diagrammatic plan view of a system for acousto-optic reproduction of character information according to the invention.

FIGS. 2–4 illustrate in diagrammatic form an acousto-optic character generator incorporating the apparatus of FIG. 1. Element 32 is depicted only in FIG. 4 for simplicity of illustration. Multi-channel frequency generator means 24 is not depicted in the referenced figures but is assumed to be present. It is further assumed that an acoustic energy representation of one or more columns of character information has been introduced into body 10. A single column of packets, which may be taken to represent column A of the character F for the purposes of discussion, appears in FIGS. 2 and 3. It will be noted that at least one sequence of packets has already traveled substantially through body 10. This will be appreciated in FIG. 2., for example, from the presence of a complete sequence of packets at frequencies f1-f5 in the middle of the acoustic energy column and additional packets at frequencies f5 and f4 from the preceding sequence appearing at the lower portion of the column. Energy packets at frequencies f1 and f2 of the subsequent sequence appear at the top of the column.

According to the method of the invention, once a complete acoustic energy representation of the character information to be reproduced has been coupled into body 10, a discrete pulse of light such as from a pulsed laser is directed into the body at an appropriate angle of incidence so as to be diffracted by the various energy packets representing the character information. In the present example, a pulsed laser beam (so designated) is incident upon the body in a direction slightly off normal to the front face 12, when viewed in a vertical plane perpendicular to the front face as in FIGS. 2 and 3. When viewed in a horizontal plane, the beam is normal to front face 12. This will be seen in FIG. 4, wherein it will also be observed that the beam width w (dimension across the acoustic energy columns) is sufficient for impinging all of the acoustic energy columns. It is noted that in practice the actual start of individual laser pulses may vary slightly in time relative to the triggering of the laser so that certain packets may have traveled through body 10 when a pulse begins, as seen in FIG. 2.

In accordance with an important energy saving feature of the invention, the laser beam height is substantially equal to the height of the character representation in body 10. In the illustrative embodiment, the beam thus has a height h equal to the combined height of five acoustic energy packets, as shown in FIGS. 2 and 3. (It will be recalled that the columns of the character F are subdivided into five segments so that the acoustic energy representation of the character in body 10 has a height of five energy packets.) A laser beam of the described height avoids any waste of laser energy in illuminating a region of body 10 of greater height than the acoustic energy representation and can further eliminate any need for beam spreading along the acoustic energy columns in many applications.

When the laser beam is pulsed into body 10 as just described, the acoustic energy packets impinged by the beam diffract respective portions of the beam to produce a group of corresponding pulsed output beams. Each of the diffracted output beams emerges from body 10 at a respective fixed angle to the incident laser beam. The angle of each output beam is established by the particular frequency of the corresponding acoustic energy packet in accordance with generally understood acousto-optic principles. In FIGS. 2 and 3, reference numeral 26 indicates a column of diffracted output beams corresponding to the packets impinged by the beam in acoustic energy column A, the output beams being depicted as individual rays for clarity of illustration. Due to the orientation of the incident beam, the diffracted beams 26 make an angle with the incident beam only in a vertical plane, as shown in the foregoing figures. In a horizontal plane, beams 26 have the same direction as the incident beam (see diffracted beams indicated by outlines d in FIG. 4). It will be appreciated, of course, that additional diffracted beams will emerge in a similar manner from any remaining columns of body 10 wherein further packets are impinged by the beam.

By way of the technique described in co-pending application Ser. No. 550,590, all of the diffracted output beams from body 10 are directed to corresponding fixed locations in a character reproduction plane 30 via converging lens means 28 having a focal plane coincident with plane 30 and diverging lens means 32 interposed between lens means 28 and plane 30, lens means 32 being shown only in FIG. 4 to simplify the drawing. To summarize briefly for present purposes, lens means 28 (which may be a spherical convex lens, as shown) acts to focus all incident light rays traveling in the same direction to a single spot in reproduction plane 30, regardless of the locations where such rays may enter the lens. Hence, even though any given output beam will move downwardly relative to lens means 28 (due to the downward movement of the corresponding energy packet in body 10 while exposed to the incident beam pulse), the beam will nonetheless be directed to a fixed spot in plane 30 by the focussing action of converging lens means 28 since the output beam direction remains fixed by the energy packet frequency. Thus in the case of diffracted beams 26, for example, there are five fixed spots in reproduction plane 30 corresponding to energy packets of frequencies f1–f5, respectively. Where, as in the present case, a plurality of adjacent columns of character information are to be reproduced, it is desirable to place diverging lens means 32 (e.g., a cylindrical lens) between converging lens means 28 and reproduction plane 30, as shown in FIG. 4. Diverging lens means 32 compensates the convergence or focussing effect of lens means 28 in horizontal planes, as will be apparent from the diffracted beam outlines at d' and d" in FIG. 4. Consequently, parallel diffracted beams from like energy packets in adjacent acoustic energy columns (e.g., packets VA, VB and VC) will be directed to horizontally adjacent positions in reproduction plane 30, rather than to the same position as would occur with lens means 28 alone. The result is a set of adjacent columns of fixed spots in reproduction plane 30, with each column corresponding to a column of character information as represented acoustically in body 10.

With an appreciation of the manner in which diffracted beams are directed from acousto-optic cell C to reproduction plane 30, the purpose and advantages of repeating the acoustic energy packet sequences in body 10 can now be understood. Referring to FIG. 2, it will be seen that when the laser is pulsed, the laser beam is incident upon five energy packets within the height of the beam. These packets, having respective frequencies f1–f5 and representing the five segments in column A of character F, produce five corresponding diffracted beams at 26 which are directed to corresponding spots S1–S5 in reproduction plane 30. Because the energy packets move downwardly in body 10 and the laser beam height h is substantially equal to that of the acoustic character representation (i.e., five packets high), it is apparent that a number of packets will travel out of the laser beam path while the beam is on. The actual number of such packets will depend on the duration of the laser pulse and the velocity of the packets in body 10. Naturally, when a packet exits the laser beam, the corresponding diffracted beam is discontinued and the associated spot in the reproduction plane 30 is no longer illuminated.

In accordance with the invention, in order to avoid uneven exposure of spots in plane 30 as a result of packets being exposed to the laser beam for different amounts of time, the sequences of energy packets in the respective acoustic energy columns are repeated as previously described. The sequence repetition is conducted for the duration of the laser pulse. Hence, as an acoustic energy packet travels out of the path of the laser beam, it is simultaneously replaced by an identical packet entering the beam. This concept is depicted in FIGS. 2 and 3 in connection with two acoustic energy packets designated I'A and I"A. FIG. 2 shows packet I'A about to exit the laser beam at the bottom. The corresponding diffracted beam is directed to spot S1 in reproduction plane 30. In FIG. 3 packet I'A has exited the laser beam but has been replaced at the top of the beam by an identical packet I"A. Since replacement packet I"A is of the same frequency as exiting packet I'A, its associated diffracted beam emerges from body 10 in the same direction as the diffracted beam from the exiting packet. Therefore, by virtue of the previously discussed properties of converging lens means 28, the diffracted output beam from packet I"A is likewise directed to spot S1, as shown in FIG. 3. It will be appreciated that the foregoing process with energy packets simultaneously exiting and entering the laser beam ensures continuous, uniform illumination of spots S1–S5 for the duration of the laser pulse since a packet's worth of energy at each of the frequencies f1–f5 will be present in the path of the beam during the entire pulse. A similar result is obtained for the remaining columns of character information reproduced in plane 30 due to the sequence repetition in the corresponding acoustic energy columns. The character information, as reproduced, will thus have a uniform intensity throughout. Naturally, once a given set of character information has been reproduced, the entire process described above may be repeated with a different set of information and the laser being pulsed again.

The invention set forth herein can be used to advantage in a wide variety of applications. One application where the invention has been found to be particularly useful is the marking of manufactured products and product packages. Because the invention permits the simultaneous generation of a plurality of complete characters, costly laser beam scanning techniques associated with previous acousto-optic character generators may be avoided (although the invention may, of course, be applied in a scanned system).

There are also significant advantages associated with the invention's use of a pulsed laser. For example, the invention provides a very practical alternative for high energy marking applications such as metal marking. A pulsed beam can apply sufficient marking energy to a metal surface before the laser energy can be conducted away from the marking zone by the target metal. A pulsed beam further avoids overexposure of the acousto-optic cell to laser energy, a problem which can be a significant limitation in acousto-optic systems employing continuous wave lasers. In continuous wave systems the acousto-optic cell is constantly exposed to the laser beam and may undergo substantial thermal expansion. This can lead to significant adverse effects on cell performance. Furthermore, substantial amounts of laser energy may be wasted in continuous wave systems because the laser beam may be on even when character generation is not actually taking place. With a pulsed system, the laser beam is on only during character generation and the acousto-optic cell is exposed to the beam energy only at such times. The associated energy savings and reduced thermal build up in the cell are important practical considerations for high energy marking applications, for example, where there may be considerable time intervals (on the order of a few seconds or more) between successive marking occurrences, such as might be the case on a manufacturing assembly line.

While preferred features of the invention have been shown and described herein, it will be apparent to those skilled in the art that numerous modifications may be made within the teachings of the invention, the scope of which is defined in the appended claims.

The invention claimed is:

1. A method of reproducing character information by acousto-optic interaction, comprising:
   providing a body of acousto-optic material and means for introducing a column of acoustic energy into said body, said column corresponding to a column of character information,
   introducing into said acoustic energy column a sequence of traveling acoustic energy packets each having a different predetermined frequency and representing a portion of said column of character information,
   pulsing a beam of light into said body for interaction with acoustic energy packets within said body to create corresponding diffracted output beams, said beam of light having a dimension in the direction of said acoustic energy column substantially the same as that of said character information column as represented by said acoustic energy packets,
   repeating said introducing until completion of said pulsing so that each energy packet traveling out of the path of said light beam is replaced by another packet of the same frequency traveling into said path for producing a corresponding diffracted output beam, and
   directing all of the diffracted output beams to corresponding locations in a character reproduction plane, with diffracted beams corresponding to acoustic energy packets of the same frequency being directed to the same location in said plane, to produce an image of the corresponding portions of said character information column.

2. The method of claim 1, wherein said introducing means comprises an acoustic transducer electrode mounted on one side of said body and wherein said introducing comprises energizing said electrode during selected time periods at respectively selected frequencies.

3. The method of claim 1, wherein said pulsing comprises pulsing a laser beam.

4. The method of claim 1, wherein said directing includes passing said diffracted output beams through converging lens means having a focal plane coincident with said reproduction plane.

5. The method of claim 1, including providing means for introducing acoustic energy into said body in a plurality of substantially parallel columns each corresponding to a different column of character information, introducing respective sequences of traveling acoustic energy packets into said plurality of acoustic energy columns, pulsing a beam of light having sufficient dimension across said acoustic energy columns to impinge said plurality thereof, repeating said introducing for the duration of said pulsing, and directing the resulting diffracted output beams from said plurality of acoustic energy columns to corresponding locations in said character reproduction plane.

6. The method of claim 5, wherein said introducing includes energizing a plurality of acoustic transducer electrodes during respectively selected time periods at respectively selected frequencies, said electrodes corresponding to said plurality of acoustic energy columns.

7. The method of claim 6, wherein said introducing includes energizing members of a set of electrodes arranged to produce overlapping acoustic energy columns within said body.

8. The method of claim 5, wherein said directing includes passing said resulting output beams through converging lens means having a focal plane coincident with said reproduction plane.

9. The method of claim 8, wherein said directing includes passing said diffracted output beams through a spherical convex lens.

10. The method of claim 8, wherein said directing includes passing said resulting output beams through diverging lens means disposed intermediate said converging lens means and said reproduction plane.

11. The method of claim 10, wherein said directing includes passing said diffracted output beams through a cylindrical lens disposed between said converging lens means and said reproduction plane.

12. Apparatus for reproducing character information by acousto-optic interaction, comprising:
   a body of acousto-optic material,
   means for introducing into a column within said body a sequence of traveling acoustic energy packets each having a different predetermined frequency and representing a portion of a column of character information, means for pulsing a beam of light into said body for interaction with acoustic energy packets within said body to create corresponding diffracted output beams, said beam of light having a dimension in the direction of said acoustic energy column substantially the same as said character information column, as represented by said acoustic energy packets, means for repeating said sequence of acoustic energy packets for the duration of the pulsing of said light beam so that each energy packet traveling out of the path of said beam is replaced by another packet of the same frequency traveling into said path for producing a corresponding diffracted output beam, and means for directing all of the diffracted output beams to corresponding locations in a character reproduction plane, with diffracted beams corresponding to acoustic energy packets of the same frequency being directed to the same location in said plane, to produce an image of the corresponding portions of said character information column.

13. Apparatus in accordance with claim 12, wherein said introducing means includes an acoustic transducer electrode mounted at one side of said body and means for energizing said electrode during selected time periods at respectively selected frequencies.

14. Apparatus in accordance with claim 12, wherein said light beam is a pulsed laser beam.

15. Apparatus in accordance with claim 12, wherein said directing means comprises converging lens means having a focal plane coincident with said reproduction plane.

16. Apparatus in accordance with claim 12, wherein said introducing means comprises means for introducing respective sequences of acoustic energy packets into said body in a plurality of substantially parallel acoustic energy columns each corresponding to a different column of character information, wherein said beam of light is a pulsed laser beam having a dimension across said acoustic energy columns sufficient for impinging said plurality thereof, wherein said repeating means comprises means for repeating the respective sequences of acoustic energy packets in said plurality of columns for the duration of said pulsing, and wherein said directing means comprises means for directing the resulting diffracted output beams from said plurality of columns to corresponding locations in said character reproduction plane, with diffracted beams resulting from packets of the same frequency in a given column being directed to the same location.

17. Apparatus in accordance with claim 16, wherein said introducing means comprises an array of acoustic transducer electrodes mounted on one side of said body, said electrodes each corresponding to a respective one of said acoustic energy columns, and means for energizing said electrodes at respectively selected times and frequencies.

18. Apparatus in accordance with claim 17, wherein said array includes electrodes disposed for introducing overlapping acoustic energy columns into said body.

19. Apparatus in accordance with claim 16, wherein said directing means comprises converging lens means having a focal plane conincident with said reproduction plane.

20. Apparatus in accordance with claim 19, wherein said converging lens means includes a spherical convex lens.

21. Apparatus in accordance with claim 19, wherein said directing means includes diverging lens means interposed between said converging lens means and said reproduction plane.

22. Apparatus in accordance with claim 21, wherein said diverging lens means comprises a cylindrical lens.

* * * * *